(12) United States Patent
Roznitsky

(10) Patent No.: US 8,829,705 B2
(45) Date of Patent: Sep. 9, 2014

(54) HYDRODYNAMIC STABILIZATION OF A FLOATING STRUCTURE

(76) Inventor: Samuel Roznitsky, Fair Lawn, NJ (US)

( * ) Notice: Subject to any disclaimer, the term of this patent is extended or adjusted under 35 U.S.C. 154(b) by 0 days.

(21) Appl. No.: 13/978,028

(22) PCT Filed: Jan. 5, 2012

(86) PCT No.: PCT/US2012/000010
§ 371 (c)(1),
(2), (4) Date: Jul. 2, 2013

(87) PCT Pub. No.: WO2012/094261
PCT Pub. Date: Jul. 12, 2012

(65) Prior Publication Data
US 2013/0277984 A1    Oct. 24, 2013

Related U.S. Application Data

(60) Provisional application No. 61/460,623, filed on Jan. 6, 2011.

(51) Int. Cl.
*F03D 9/00* (2006.01)
(52) U.S. Cl.
USPC .............................................. 290/54; 416/85

(58) Field of Classification Search
USPC .............................. 290/43, 44, 54, 55; 416/85
See application file for complete search history.

(56) References Cited

U.S. PATENT DOCUMENTS

| | | | | |
|---|---|---|---|---|
| 6,100,600 | A * | 8/2000 | Pflanz | 290/54 |
| 7,075,189 | B2 * | 7/2006 | Heronemus et al. | 290/44 |
| 7,156,586 | B2 * | 1/2007 | Nim | 405/223.1 |
| 7,456,515 | B2 * | 11/2008 | Nielsen | 290/55 |
| 7,612,462 | B2 * | 11/2009 | Viterna | 290/53 |
| 8,022,566 | B2 * | 9/2011 | Loh et al. | 290/44 |
| 8,169,099 | B2 * | 5/2012 | Roznitsky et al. | 290/44 |
| 8,446,027 | B2 * | 5/2013 | Laz et al. | 290/42 |
| 8,689,721 | B2 * | 4/2014 | Wang | 114/264 |
| 8,692,401 | B2 * | 4/2014 | Roddier et al. | 290/44 |

* cited by examiner

*Primary Examiner* — Nicholas Ponomarenko
(74) *Attorney, Agent, or Firm* — Anna Vishew

(57) ABSTRACT

A floating platform including a plurality of pontoons providing buoyancy to the platform, and a ballast section imparting a spatial orientation to the platform. The ballast section includes a high density ballast being an aggregation of rocks, an aggregation of chunks of iron ore, or an aggregation of any other high density material. Further, the ballast section is permeable to a fluid medium in which the platform floats so as to cause a high friction between the high density ballast and the fluid medium.

4 Claims, 2 Drawing Sheets

HYDRODYNAMIC STABILIZATION OF A FLOATING STRUCTURE

CROSS-REFERENCE TO RELATED APPLICATIONS

This Application relates to and claims all rights of priority to U.S. Provisional Patent Application No. 61/460,623, entitled "Hydrodynamic Stabilization of Floating Wind Turbine", and filed on Jan. 6, 2011.

BACKGROUND

Present application generally relates to the field of stabilization devices for offshore floating structures.

Ships as well as other floating structures customary include means for lowering the gravity center and thus improving the structure's stability in rough seas, a.k.a. ballast. The customary practice of placing ballast in ship's hull, preferably below the waterline, enhances ship's resistance to overturning. The ballast commonly consists of water, or high density material, or a combination of both. It's well known that ballast affects the natural frequency of ship's rolling and improves ship's steadiness. However, ballast can also be used to diminish the severity of ship's movements. The present application discloses the construction and method of utilizing ballast for dampening the movements of a floating platform structure, in particular a floating wind turbine platform's movements.

SUMMARY

In the general aspect, the present invention is a floating platform including a plurality of pontoons providing buoyancy to the platform, and a ballast section imparting a spatial orientation to the platform. The ballast section includes a high density ballast being an aggregation of rocks, an aggregation of chunks of iron ore, or any other aggregation of a high density material. Further, the ballast section is permeable to a water medium in which the platform floats so as to cause a high friction between the high density ballast and the water medium.

One of the inventive embodiments is an offshore floating wind turbine including a rotor, a hub, a floating base and a tower. The rotor converts a motion of air into a movement of the rotor, and the hub houses equipment that transforms the movement of the rotor into a useful form of energy. The hub and the rotor are mounted on the floating base, which is movable with respect to an underlying solid surface. The floating base includes a plurality of pontoons and a high density ballast section containing a high density ballast, which is an aggregation of pieces of a high density material. The high density ballast section is permeable to a fluid medium in which the base floats causing a high friction between the high density material and the fluid medium. Finally, the tower supports the hub and the rotor on one end and is fixedly connected to the floating base on the other end.

The ballast of a sufficiently large platform (like a platform carrying a wind turbine) is placed at depths wherein water-surface wave action gets amply diminished due to the naturally occurring attenuation of water particles within water column. The ballast, therefore, is engulfed by calm water medium. Consequently, the movement which is induced upon the floating structure by wind and waves on the water surface becomes attenuated (dampened down) due to the drag force experienced by the ballast moving through the calm water medium at depth, i.e., it functions akin to adynamic anchor.

In the science field of fluid dynamics, it is well established that an object moving through a fully enclosing fluid is experiencing a force of drag Fd that is proportional to square of the object's velocity v with respect to the fluid and also proportional to the "reference" area A of the object.

$$Fd \sim v^2 A$$

Herein, A is a "reference" area that is characterized by the object's size and form factors.

Generally, a bigger body having a larger fluid contact area and better ability to "entrap" fluid experiences higher drag. Therefore, other things being equal, a ballast body permeable to fluid is subjected to a greater drag force than a solid block of the same shape and weight. Empirical measurements of an aggregation of rocks having linear sizes equal to ⅙-¼ of the whole pack confirmed the force impinging upon the pack in water as being 2.3 times higher than the force affecting a single boulder of equal weight. Furthermore, swifter ballast's movements are subjected to exponentially higher drag force than slower movements, thus effectively dampening down the excessive volatility.

The above aspects, advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION

Figure 1:
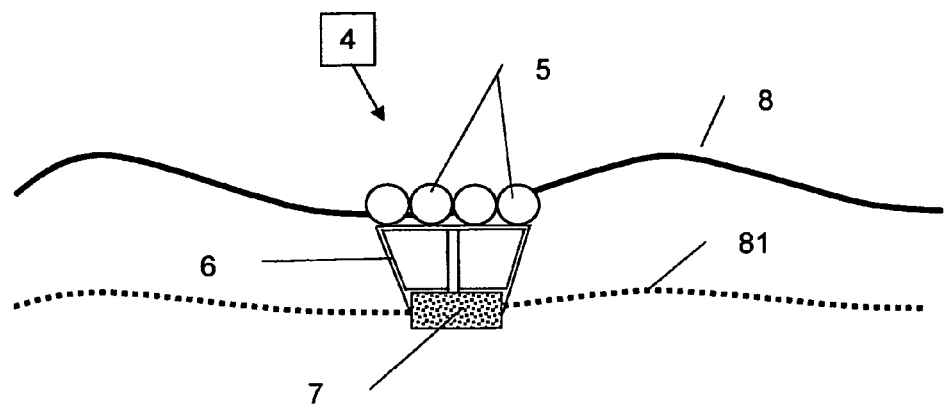
FIG. 1 shows a floating platform having pontoons 5 and ballast 7 comprising high-density material.

As shown in FIG. 1, the design of a floating platform 4 includes a high density ballast section 7 located in a floating platform, which ballast section provides a simple, robust, and inexpensive method for achieving static stability of the platform and additional hydrodynamic dampening of the platform motion, thus minimizing loading on the support structure and mooring lines. The floating platform 4 has multiple pontoons 5 positioned close or at water surface 8. Pontoons 5 provide buoyancy in the water. The floating platform further includes a frame 6 with a high density ballast 7 of sufficient mass secured thereto. High density ballast 7 serves as a counterweight and assures platform's static upright stability. FIG. 1 also schematically depicts the naturally occurring phenomena of water particles movement's attenuation at water depth at which the ballast 7 is placed, and represented by line 81.

Figure 2:
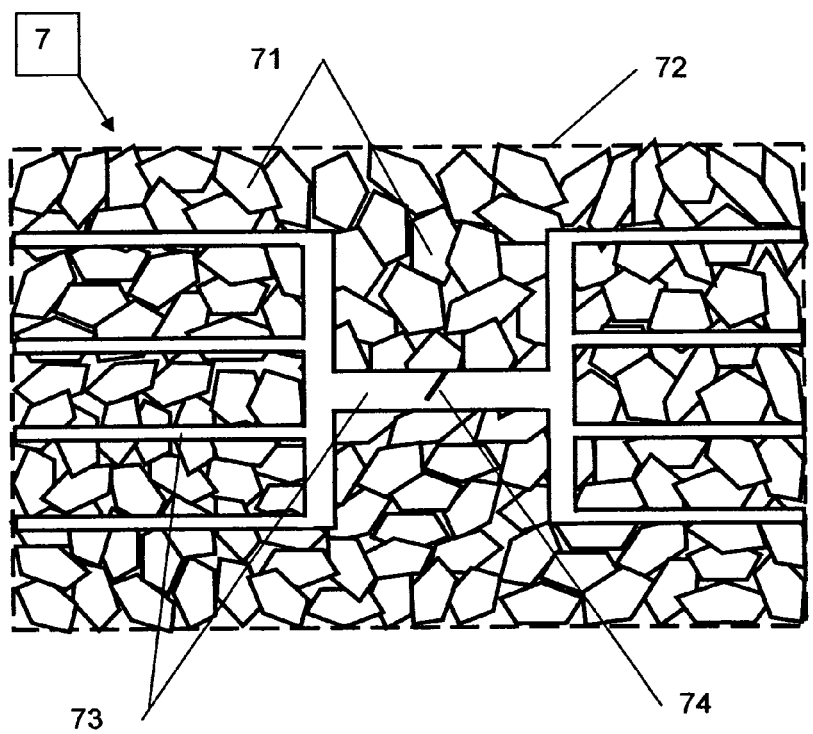
FIG. 2 shows a schematic representation of the high-density ballast section 7.

In one preferred embodiment, high density ballast 7 includes broken rock pieces 71 contained in mesh baskets 72 preferably of the type used in construction and known as "gabion" in construction trade. A schematic representation of the high-density ballast section is shown in FIG. 2. The structure is permeable to water 8 on each side of the basket 72. As such, viscosity of water 8 percolating through the porous rock ballast creates hydrodynamic dampening forces.

The dampening properties of the rock ballast 7 depend on the volume of the percolating water flow, which, in turn, depends on the size of the rock pieces in the basket and their assortment. Empirically, it was determined that, for effective dampening, the product (VwSw) of water volume Vw contained within the crevices of the ballast body and the surface area Sw of this volume, preferably should be at least 4 times larger than the product (VbSb) of the ballast's volume Vb if the ballast body were one solid piece and its surface area Sb:

$$(VwSw) \geq 4(VbSb)$$

Thus, the rock pieces' dimensions and their aggregations are selected to satisfy this empirically established condition.

Optional channels 73 within the loosely placed broken rock can be created to accommodate an increase of the water flow. Furthermore, optional flaps 74 regulating the flow volume can effectively adjust hydrodynamic dampening to obtain the desired dampening rate and to satisfy stability requirements. The adjustment can be done per corresponding sea conditions and according to the sensory input obtained from accelerometers placed on the floating structure. The system is simple and robust. The channels' throughput should preferably be in excess of 15% of the total water volume within the ballast body in order to have a significant effect. Nonetheless, even without the inclusion of the flow-enhancing channels, the plain broken rock ballast will perform wholly adequately in most cases.

Although the construction and method of utilizing the ballast are discussed herein with respect to a specific floating structure, it should be understood by a person skilled in the art that this construction and method are applicable to any floating platform whereas hydrodynamic dampening is desirable.

Figure 3:
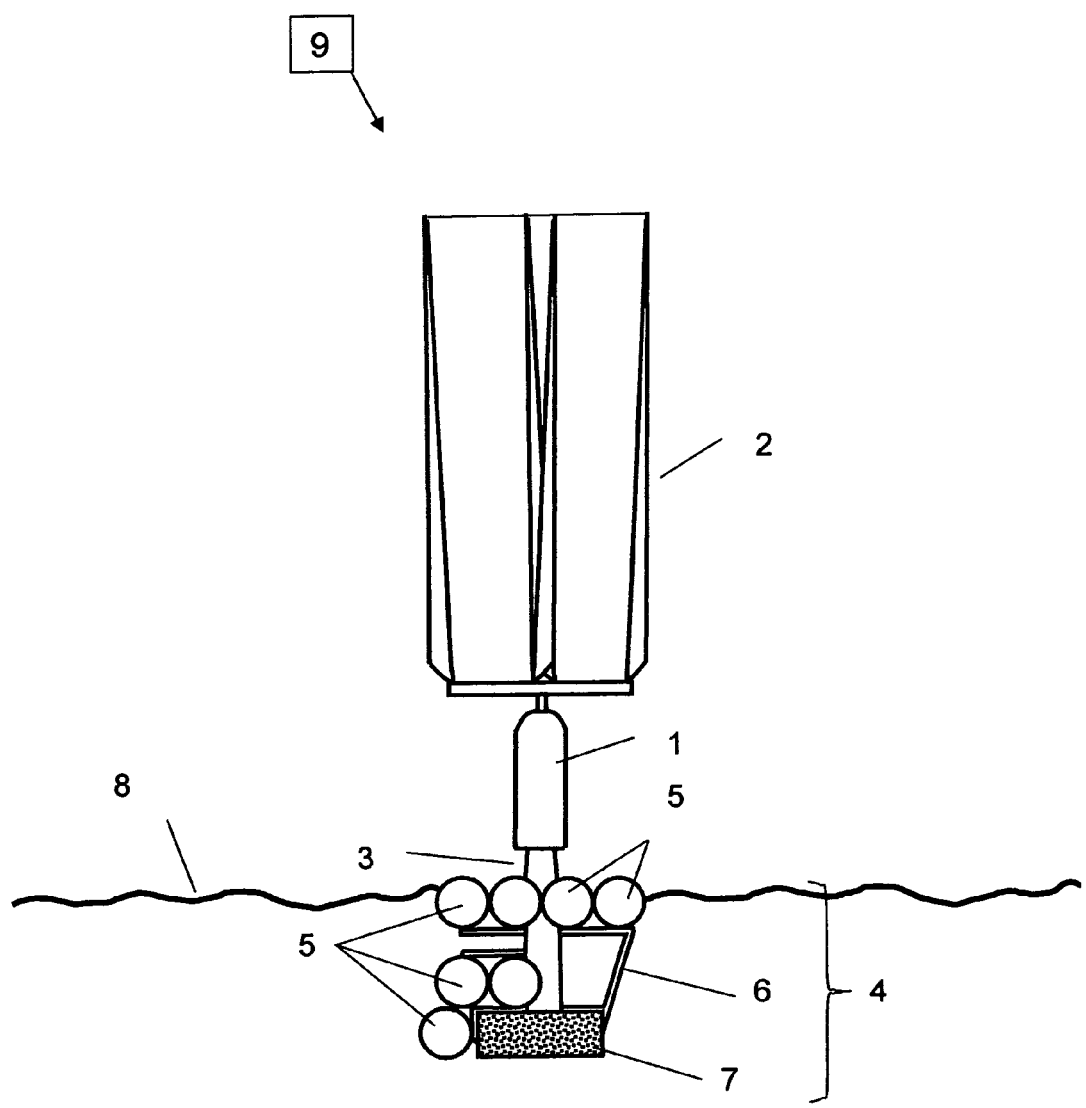
FIG. 3 shows a floating wind turbine having a platform 4 with pontoons 5 and high-density ballast section 7.

An example of the floating structure preferred embodiment is presented by a floating wind turbine schematically shown in FIG. 3. The floating turbine 9 preferably includes a hub 1, rotor 2, turbine tower 3, and floating base 4. Pontoons 5 of the floating base 4 at a bottom of turbine tower 3 serve as means providing buoyancy in water 8, high density ballast 7 of sufficient mass secured to a frame 6 serves as a counterweight. The high density ballast 7 comprising broken rock aggregations as shown in FIG. 2 is serving as an inexpensive, robust and effective means for securing turbine's 9 upright position and dampening its wave- and wind-induced undesirable tumble in rough seas.

In the preceding specification, the invention has been described with reference to specific exemplary embodiments thereof. It will however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A floating platform comprising:
    a plurality of pontoons operable to provide buoyancy; and
    a ballast section operable to impart spatial orientation, the ballast section comprising a high density ballast being an aggregation of pieces of a high density material, the high density ballast being permeable to a fluid medium in which the platform floats so as to cause a high friction between the high density ballast and a percolating fluid medium,
    wherein a product of a fluid medium volume within crevices of the high density ballast and a surface area of this fluid medium volume is at least 4 times greater than a product of a volume of the high density ballast if the high density ballast were one solid piece and a surface area of the high density ballast if the high density ballast were one solid piece.

2. The floating platform according to claim 1, wherein the high density ballast of the floating platform includes at least one fluid flow-enhancing channel operable to establish an appropriate rate of the platform's hydrodynamic stabilization.

3. The floating platform according to claim 2, wherein at least one fluid flow-enhancing channel includes a flow-regulating flap operable to calibrate a stabilization effect of the platform.

4. The floating platform according to claim 1, wherein the high density material comprises at least one of pieces of rocks and chunks of iron ore contained in a mesh enclosure.

* * * * *